United States Patent
Zhu et al.

(10) Patent No.: US 9,125,152 B2
(45) Date of Patent: Sep. 1, 2015

(54) BEACON SYNCHRONIZATION IN WIFI BASED SYSTEMS

(75) Inventors: Haifeng Zhu, Vernon, CT (US); Vijaya Ramaraju Lakamraju, Longmeadow, MA (US); Alan Matthew Finn, Hebron, CT (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 482 days.

(21) Appl. No.: 13/136,984

(22) Filed: Aug. 16, 2011

(65) Prior Publication Data

US 2013/0044658 A1 Feb. 21, 2013

(51) Int. Cl.
*H04W 56/00* (2009.01)
*H04W 52/02* (2009.01)

(52) U.S. Cl.
CPC ...... *H04W 56/0035* (2013.01); *H04W 52/0229* (2013.01)

(58) Field of Classification Search
USPC ........... 370/311, 324, 345, 350, 395.2, 395.4, 370/395.21, 432, 503–520
See application file for complete search history.

(56) References Cited

U.S. PATENT DOCUMENTS

| | | | |
|---|---|---|---|
| 4,193,118 A * | 3/1980 | Nash et al. | 708/445 |
| 6,161,005 A | 12/2000 | Pinzon | |
| 6,337,618 B1 | 1/2002 | Craig et al. | |
| 6,472,973 B1 | 10/2002 | Harold et al. | |
| 6,720,861 B1 | 4/2004 | Rodenbeck et al. | |
| 7,755,480 B2 | 7/2010 | Aritsuka et al. | |
| 8,005,515 B1 * | 8/2011 | Chhabra et al. | 455/574 |
| 8,159,977 B2 * | 4/2012 | Meier | 370/278 |
| 8,488,506 B2 * | 7/2013 | Husted et al. | 370/311 |
| 2001/0050615 A1 | 12/2001 | Kucharczyk et al. | |
| 2002/0099945 A1 | 7/2002 | McLintock et al. | |
| 2002/0178385 A1 | 11/2002 | Dent et al. | |
| 2003/0144020 A1 | 7/2003 | Challa et al. | |
| 2003/0218383 A1 | 11/2003 | Milojicic et al. | |
| 2004/0264477 A1 * | 12/2004 | Repko et al. | 370/395.62 |
| 2005/0169233 A1 * | 8/2005 | Kandala et al. | 370/349 |
| 2006/0139149 A1 | 6/2006 | Faro et al. | |
| 2006/0164208 A1 | 7/2006 | Schaffzin et al. | |

(Continued)

FOREIGN PATENT DOCUMENTS

| | | | |
|---|---|---|---|
| WO | 9948221 A1 | 9/1999 | |
| WO | 2009158181 A1 | 12/2009 | |

(Continued)

OTHER PUBLICATIONS

ANSI/IEEE Std. 802.11, 1999 Edition (R2003), IEEE LAN/MAN Standards Committee, Information Technology-Telecommunications and Information Exchange Between Systems-Local and Metropolitan Area Networks-Specific Requirements, Part 11.*

(Continued)

*Primary Examiner* — Benjamin H Elliott, IV
*Assistant Examiner* — Eric Nowlin
(74) *Attorney, Agent, or Firm* — Cantor Colburn LLP

(57) ABSTRACT

A wireless device comprises a transceiver and a scheduling system. The transceiver transmits and receives messages to and from an access point, and has a sleep mode from which it occasionally wakes at wakeup times to listen for beacons from the access point. The scheduling system schedules wakeup times according to historical beacon synchronization data.

12 Claims, 4 Drawing Sheets

(56) References Cited

U.S. PATENT DOCUMENTS

| | | |
|---|---|---|
| 2006/0170533 A1 | 8/2006 | Chioiu et al. |
| 2007/0030120 A1 | 2/2007 | Gusse et al. |
| 2007/0131005 A1 | 6/2007 | Clare |
| 2007/0200666 A1 | 8/2007 | Howard |
| 2007/0259700 A1* | 11/2007 | Meier et al. ............... 455/574 |
| 2007/0266081 A1 | 11/2007 | Murchison, III et al. |
| 2007/0290793 A1 | 12/2007 | Tran |
| 2008/0036596 A1 | 2/2008 | Auerbach et al. |
| 2008/0084836 A1 | 4/2008 | Baird et al. |
| 2008/0117045 A1 | 5/2008 | Roberts et al. |
| 2008/0174403 A1 | 7/2008 | Wolpert et al. |
| 2008/0225768 A1* | 9/2008 | Wentink ............... 370/311 |
| 2009/0298555 A1 | 12/2009 | Matson et al. |
| 2010/0060414 A1 | 3/2010 | Im |
| 2010/0098204 A1* | 4/2010 | Ratiu et al. ............... 375/371 |
| 2010/0141381 A1 | 6/2010 | Bliding et al. |
| 2010/0148918 A1 | 6/2010 | Gerner et al. |
| 2010/0164720 A1 | 7/2010 | Kore |
| 2010/0201482 A1 | 8/2010 | Robertson et al. |
| 2011/0222421 A1* | 9/2011 | Jana et al. ............... 370/252 |

FOREIGN PATENT DOCUMENTS

| | | |
|---|---|---|
| WO | 2010043947 A1 | 4/2010 |
| WO | 2010085781 A1 | 7/2010 |

OTHER PUBLICATIONS

PCT International Preliminary Report on Patentability and Written Opinion of the International Searching Authority for International Application No. PCT/US2012/046515, Feb. 27, 2014, 7 pages.

* cited by examiner

BEACON SYNCHRONIZATION IN WIFI BASED SYSTEMS

BACKGROUND

The present invention relates generally to wireless devices, and more specifically to time synchronization between wireless devices and access points.

Many low-power wireless devices conserve power by sleeping much of the time, and waking only occasionally to perform operations or send or receive data. In these situations, messages from a device node are conventionally buffered at wireless access points, and relayed to recipient wireless devices when those devices wake. IEEE 802.11 standard access points, for instance, typically transmit periodic beacon messages indicating whether buffered messages are waiting for a recipient wireless device.

Wireless devices intended to operate on minimal power commonly wake at a "heartbeat" interval to transmit and/or receive messages. This heartbeat interval can be several minutes long. Upon the elapse of each heartbeat interval, the wireless device transmits a heartbeat message to a device node such as a central server via the access point, then enters a short-term sleep mode until the next scheduled beacon transmission from the access point. The wireless device wakes in time to hear a beacon from the access point, requests and receives any buffered messages, and then sleeps for another heartbeat interval.

Wireless devices conventionally schedule wakeup times according to their own clocks. To receive a beacon, a transceiver of the wireless device must remain powered, consuming energy. Conventional systems usually use a constant heartbeat interval as determined by to a local clock of the wireless device, and provide a margin preset according to the maximum possible clock drift expected over the course of a heartbeat interval. The IEEE 802.11 standard allows a maximum clock discrepancy of 0.02%. Desynchronization of this magnitude can necessitate large energy expenditures for powering wireless device transceivers while waiting for a beacon transmission. A heartbeat interval of five minutes, for example, is conventionally allowed a maximum drift of 60 ms, such that the wireless device transceiver might remain powered for 60 ms every 5 minutes while waiting for a beacon, resulting in significant energy expenditure, and correspondingly shortening battery life when compared to a intelligent wake-up mechanism in which the transceiver is well synchronized and need remain powered for much lesser than 60 ms. Depending on the available battery capacity and the device activations, this might reduce battery life by up to several years. For wireless devices intended to operate for long periods on battery power, such battery depletion is not ideal.

Many IEEE 802.11 access points also monitor networked wireless devices for continued activity. If a predefined linkup interval elapses without activity from a networked wireless device, the wireless device is dissociated from the access point's network. By one common method, each wireless device periodically transmits linkup messages in order to remain associated with the access point. The length of the linkup interval—the period between linkup messages—is based on the device's local clock and is usually a constant.

Messages from wireless devices can be corrupted during transmission, sometimes necessitating retransmissions. A wireless device transmission made too close in time before a beacon transmission, where the wireless device transmission is followed immediately by going to sleep, may not allow sufficient time for recipient device nodes to respond before the wireless device wakes to listen for an expected response. When this occurs, the wireless device must either remain awake to receive two beacons, or enter short-term sleep and wake to listen to the second beacon, in either case expending additional power.

SUMMARY

The present invention is directed toward a wireless device with a transceiver and a scheduling system. The transceiver transmits and receives messages to and from an access point, and has a sleep mode from which it occasionally wakes at wakeup times to listen for beacons from the access point. The scheduling system schedules wakeup times according to historical beacon synchronization data.

DETAILED DESCRIPTION

Figure 1:
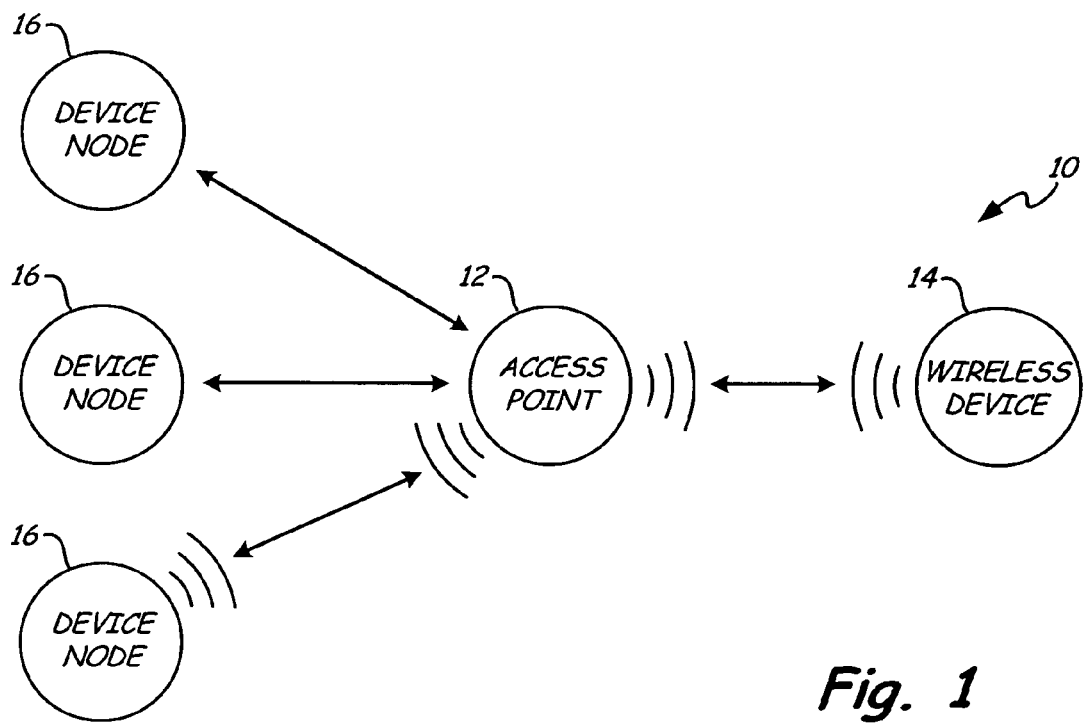
FIG. 1 is a system diagram of a representative wireless network of the present invention, including a plurality of device nodes, a wireless access point, and a wireless device. This describes a typical situation where both wired and wireless networks co-exist.

FIG. 1 is a system diagram of a network 10, comprising access point 12, wireless device 14, and a plurality of device nodes 16. Access point 12 is a wireless device such as a router, which provides a network connection between wireless device 14 and at least one device node 16. Wireless device 14 is a device in the wireless network of access point 12, and may be one of a plurality of identical or dissimilar wireless devices. Each device node 16 is a device or system connected to wireless device 14 via access point 12. Device nodes 16 may, for instance, be remote signal processing or command servers, or other devices on the network of access point 12. Device node 16 may be connected to access point 12 wirelessly or via wired connection, and communicates with wireless device 14 only through access point 12.

Wireless device 14 may perform any of a wide range of functions, including condition monitoring, process actuation, or data transducing, and may generally be any wireless device which experiences low-power sleep modes. Wireless device 14 may, for instance, be a device that operates on scavenged power or a limited battery power supply, and sleeps to conserve power between active duty periods.

Data transmitted from device nodes 16 is not received directly at wireless device 14. Instead, packets from device nodes 16 to wireless device 14 are buffered at access point 12. Access point 12 transmits timestamped beacon messages to all devices in its network, including wireless device 14. These beacons are sent at regular beacon intervals (e.g. 102.4 ms in an IEEE 802.11 network), and indicate whether buffered packets are waiting for any wireless devices in the network. If and when wireless device 14 receives a beacon from access point 12 indicating that packets are buffered for it at access point 12, wireless device 14 transmits a request to the access point 12 and the access point sends the buffered packet(s), which the wireless device 14 receives, as described in the IEEE 802.11 protocol.

If access point 12 detects no activity from wireless device 14 over the course of a predetermined linkup interval, access point 12 may dissociate wireless device 14 from its wireless network. This linkup interval is product-specific and may be infinite, indicating that access point 12 will never dissociate wireless device 14 from the wireless network. In conventional systems with finite linkup intervals, wireless device 14 periodically transmits packets (herein referred to as "linkup" packets or messages) to access point 12, to avoid being dissociated from the wireless network.

Wireless device 14 is capable of spending long periods in a low-power sleep mode in which it sends and receives no signals to or from access point 12. A scheduling system enables wireless device 14 to wake at optimal times for beacon reception and signal transmission, as described below.

Figure 2:
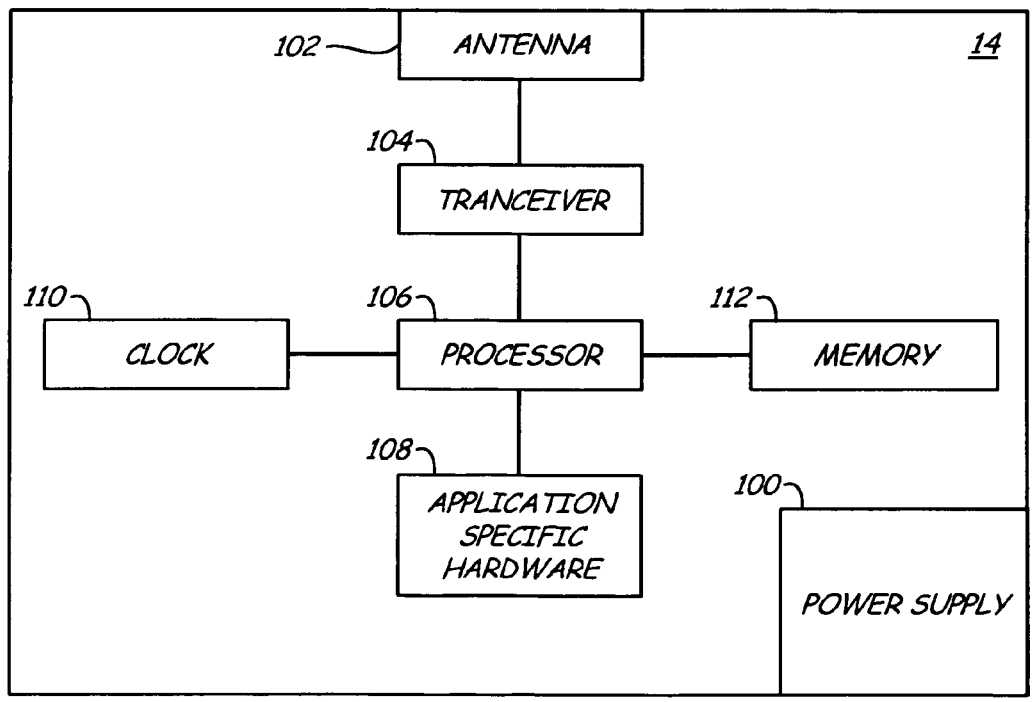
FIG. 2 is a functional block diagram of the wireless device of FIG. 1.

FIG. 2 is a block diagram of functional components of wireless device 14, which comprises power supply 100, antenna 102, transceiver 104, processor 106, application specific hardware 108, clock 110, and memory 112. Power supply 100 is a limited capacity power source such as an energy scavenging system, a battery, a fuel cell, or a capacitor, which provides power to other components of wireless device 14. Antenna 102 is an antenna or array of antennas for wireless data transmission and reception. Transceiver 104 is a data transducer which converts signals received by antenna 102 into a format readable by processor 106, or signals from processor 106 into a format transmissible from antenna 102. Processor 106 is a logic-capable component or series of components such as a microprocessor or a hardware logic system, which runs algorithms of wireless device 14. Application specific hardware 108 is hardware used for the particular application to which wireless device 14 is devoted. Application specific hardware 108 may, for instance, comprise sensors, actuators, data transducers, and displays. Clock 110 is a low-power timekeeper used at least for scheduling wakeup times. Memory 112 is a data storage component, which typically includes both RAM (Random Access Memory) and sleep-survivable memory such as Flash memory in which data can be kept through sleep modes. These functional components may share physical hardware, in some cases. For instance, clock 110 may be integrated into a microprocessor which also performs the functions of processor 106.

Application specific hardware 108 may serve a variety of different functions, depending on the tasks to which wireless device 14 is devoted. Wireless device 14, may, for instance, be an alarm or process monitoring device, in which case application specific hardware 108 will include sensors which produce signals interpreted by processor 106. In another embodiment, wireless device 14 may be an actuator or actuator controller which regulates or controls some parameter or process according to instructions from device node 16. Regardless of the particular function of wireless device 14 or the nature of application specific hardware 108, application specific hardware 108 is logically distinct from the wakeup scheduling system of wireless device 14, which is described in detail below.

Antenna 102 and transceiver 104 are used to receive and transmit signals to and from access point 12, including linkup messages to access point 12, beacons from access point 12, and transmissions to device node 16 via access point 12. Processor 106 performs logic to schedule sleep and wakeup for wireless device 14, as well as performing logic for application specific hardware 108. Clock 110 is a continuous timekeeper which provides a time value to processor 106, which may contain timers that wake up all or part of the wireless device at specific time value of Clock 110. Memory 112 stores data from processor 106, including while wireless device 14 is in a sleep mode.

Antenna 102 and transceiver 104 are shut off or powered down during a low-power sleep mode of wireless device 14 to conserve power from power supply 100. In some embodiments, other components, such as portions of processor 106, are also shut down during sleep modes. Some, all, or none of application specific hardware may operate throughout both sleep and non-sleep modes, depending on the nature of the application to which wireless device 14 is devoted. Processor 106, clock 110, and memory 112 together provide a scheduling system, as described below, which minimizes energy expenditure by reducing the time wireless device 14 spends awake.

While in sleep mode, wireless device 14 will ordinarily miss many beacons from access point 12. Upon waking from sleep mode, wireless device 14 transmits packets (such as linkup packets) to local access point 12 or listens for a beacon from local access point 12. Wireless device 14 draws power from power supply 100 during both transmission and listening/receiving. Wakeup times for both transmission and listening are scheduled to minimize power consumption by wireless device 14.

Ideally, wireless device 14 wakes up, transmits a packet, and begins to listen for a beacon shortly before access point 12 transmits the beacon. In practice, however, clock 110 and the clock of access point 12 are never perfectly synchronized. Both clocks experience some degree of clock drift, producing a net clock drift equal to the difference between the drift of clock 110 of wireless device 14 and the drift of the clock of access point 12. The larger this net clock drift is, the greater the eventual desynchronization between wireless device 14 and access point 12. After a long period in sleep mode (e.g. several minutes), wireless device 14 may to be significantly desynchronized from access point 12. To handle this desynchronization, wireless device 14 schedules wakeup times according to predicted behavior of access point 12, and not simply according to the elapse of a beacon interval according to clock 110.

Figure 3:
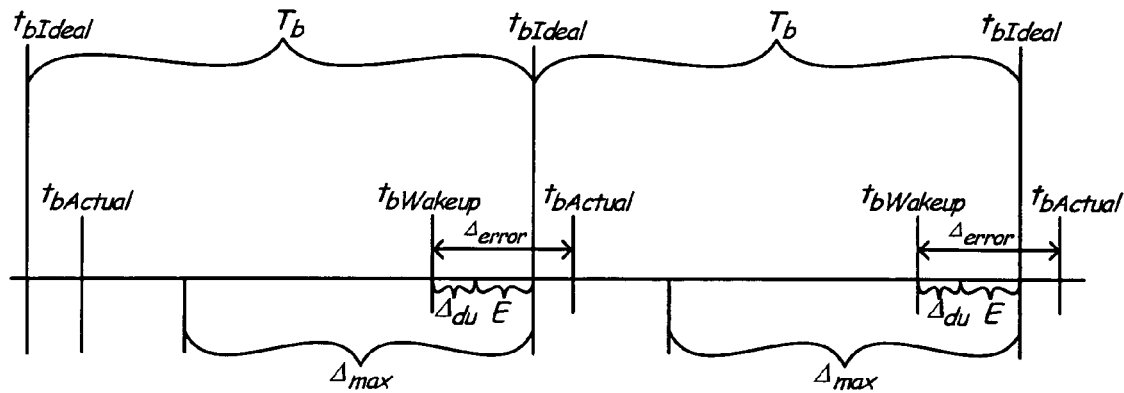
FIG. 3 is a timeline indicating wireless device wakeup times for beacon reception.

FIG. 3 is a timeline of potential wakeup times of a wireless device 14 for beacon reception, and is not drawn to scale. All times are represented in the reference frame of wireless device 14. FIG. 3 spans two beacon intervals $T_b$. $T_b$ is defined as the period between ideal beacon times $t_{bIdeal}$. Ideal beacon times $t_{bIdeal}$ are beacon reception times in an idealized perfectly regular system with no clock drift or component delays, and may correspond, for instance, to target beacon transmission times—TBTT—in IEEE 802.11 standard nomenclature. A beacon actually arrives at wireless device 14 at actual beacon arrival time $t_{bActual}$, which may be delayed relative to ideal beacon time $t_{bIdeal}$ for a variety of reasons, including software, hardware, and traffic delays. Antenna 102 and transceiver 104 of wireless device 14 wake from a sleep mode and begin to receive power at beacon reception wakeup time $t_{bWakeup}$. Transceiver 104 and antenna 102 require some time to ramp up to a full voltage required to receive packets. Accordingly, beacon reception wakeup time $t_{bWakeup}$ is scheduled a hardware-specific device-power-up period $\Delta_{du}$ before ideal beacon time $t_{bIdeal}$. Beacon reception wakeup time $t_{bWakeup}$ is separated from $t_{bActual}$ by error term $\Delta_{error}$.

If wireless device 14 and access point 12 never experienced any relative clock drift, beacon reception wakeup time $t_{bWakeup}$ would always occur such a device-up period $\Delta_{du}$ before ideal beacon time $t_{bIdeal}$, such that $t_{bWakeup} = t_{bIdeal} -$ $\Delta_{du}$. Device-up period $\Delta_{du}$ is device dependent, and can be modeled as a constant. For real systems with clock drift, however, $t_{bWakeup}$ is offset by an additional synchronization error E, such that:

$$t_{bIdeal} - t_{bWakeup} = \Delta_{du} + E \qquad \text{[Equation 1]}$$

where E reflects the relative clock drift of wireless device 14 and access point 12. Synchronization correction X is applied to the next $t_{bWakeup}$ (for example in the next heartbeat wakeup), and is at least in part determined from a history of recent beacon arrival times $t_{bActual}$ or error terms $\Delta_{error}$ and relative clock drift E, as described below with respect to FIGS. 5 and 6. Synchronization correction X can be either positive or negative, depending on the direction of relative clock drift between wireless device 14 and access point 12. Those skilled in the art will recognize that the timeline of FIG. 3 provides only a simplified illustration of beacon times. In practice, additional delays, adjustments, and error margins may be included, some of which are discussed in further detail below. In addition, components other than antenna 102 and transceiver 104 may have separate sleep and wake modes, and may be awake during some periods when antenna 102 and transceiver 104 are asleep, such as to perform scheduling operations or application-specific tasks.

Prior art wakeup systems have scheduled wakeup times according to a static maximum IEEE allowed beacon desynchronization $\Delta_{max}$. This approach can result in significant energy drain, as antenna 102 and transceiver 104 remain powered while waiting for beacon transmissions. By contrast, the present invention determines $t_{bWakeup}$ based on a history of recent beacon reception times, as described with respect to FIGS. 5 and 6, so as to reduce the time between beacon reception wakeup time $t_{bWakeup}$ and actual beacon reception, thereby reducing the time local antenna 102 and transceiver 104 of wireless device 14 consume power, and thus conserving the power of power supply 100.

Figure 4:
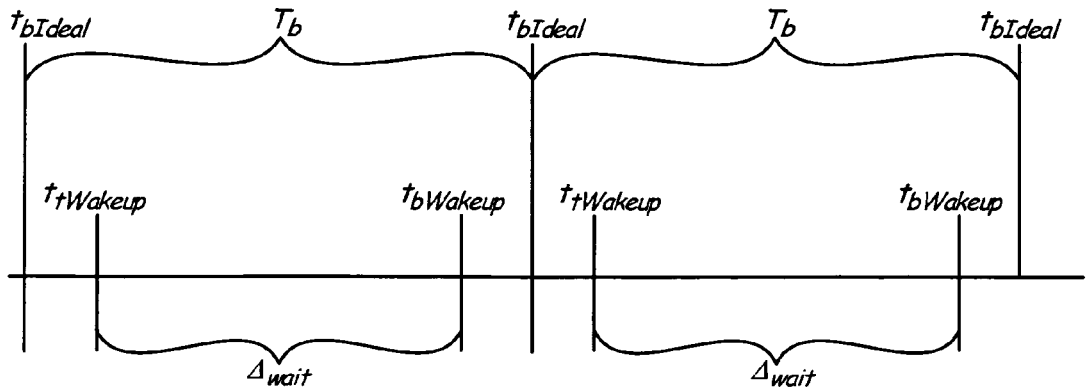
FIG. 4 is a timeline indicating wireless device wakeup times for applications that involve transmissions.

FIG. 4 is a timeline of potential wakeup times of wireless device 14 for transmission, and is not drawn to scale. FIG. 4 spans two beacon intervals $T_b$, as described above with respect to FIG. 3. Ideal beacon times $t_{bIdeal}$ are separated by beacon intervals $T_b$.

Wireless device 14 wakes from sleep mode at beacon reception wakeup times $t_{bWakeup}$ to listen for beacons from access point 12, and at transmission wakeup times $t_{tWakeup}$ to transmit messages to access point 12. Transmission wakeup times $t_{tWakeup}$ are separated from beacon reception wakeup time $t_{bWakeup}$ by wait periods $\Delta_{wait}$. Messages transmitted to access point 12 include messages for which access point 12 is the final recipient, such as linkup messages, as well as messages intended for device nodes such as device node 16, which are received by access point 12 before being forwarded on. Responses may be expected to some messages, such as requests for instructions from device node 16, and not to others, such as linkup messages. Transmissions to which no response is expected may be transmitted at any time far enough from beacon reception wakeup times to avoid coincidence with beacons transmitted by access point 12. Accordingly, $\Delta_{wait}$ may be short for transmissions for which no response is requested, and no immediately subsequent $t_{bWakeup}$ is an planned. When scheduling transmissions to which a response is expected, however, $\Delta_{wait}$ may be extended to allow the transmission to be processed by device node 16, and a response buffered at access point 12 before the next beacon transmission. After such a transmission, wireless device 14 enters a short term sleep mode until beacon reception wakeup time $t_{bWakeup}$, which is scheduled before the next beacon as described with respect to FIG. 3. By predicting beacon times, the present invention minimizes the risk wireless device 14 will attempt transmissions during beacons, necessitating later retransmission.

Whereas a wireless device ideally wakes up for beacon reception immediately before access point 12 transmits a beacon, the opposite is true for transmission wakeup times in the present invention. Transmission wakeup times are ideally scheduled as far as possible from beacon times, and transmission wakeup times $t_{tWakeup}$ may accordingly be scheduled during the first half of each beacon interval $T_b$. Wait periods $\Delta_{wait}$ are selected to allow for delays and processing times, so that transmission wakeup times $t_{tWakeup}$ are scheduled as far as possible from beacon wakeup times $t_{bWakeup}$. This reduces the probability of collision with the beacon when packet retransmission happens.

Figure 5:
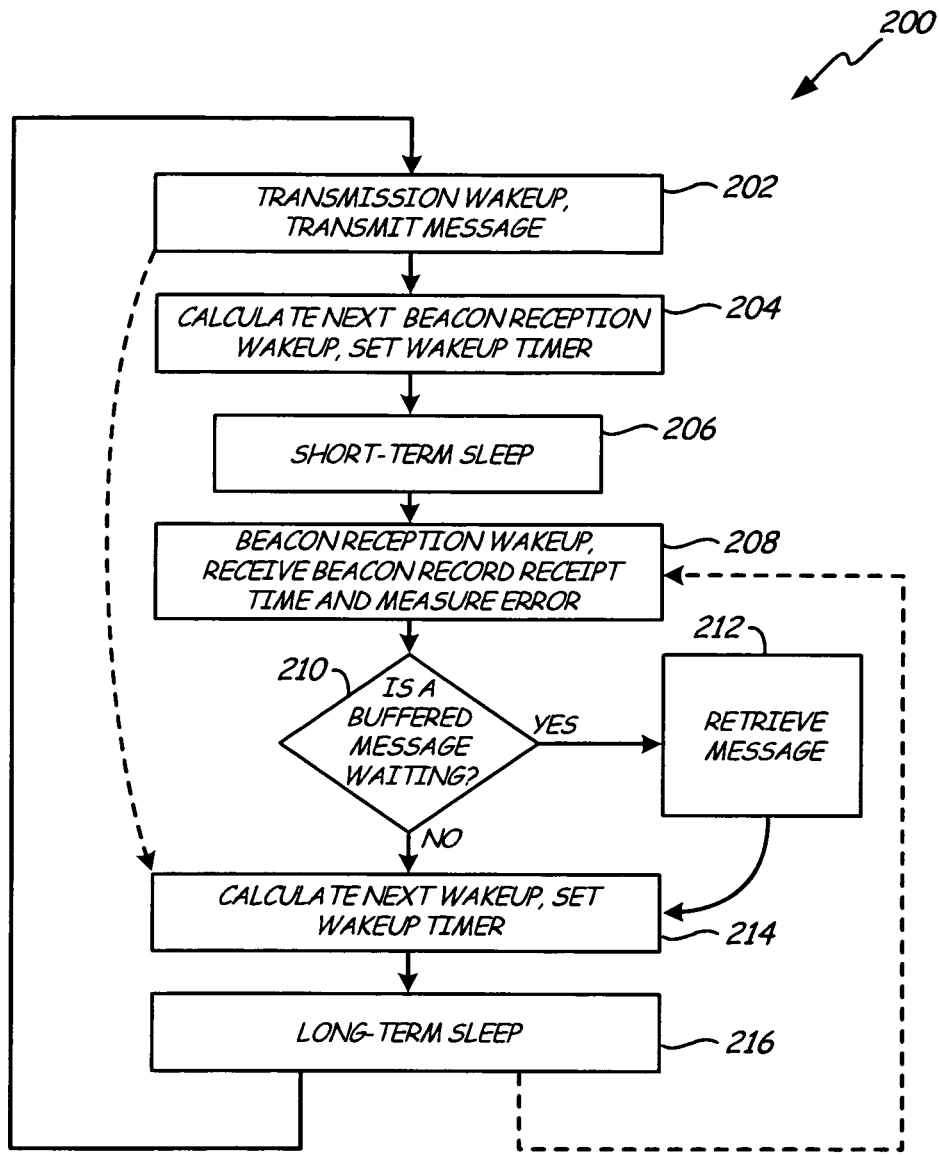
FIG. 5 is a flowchart depicting a method of operation of the wireless device of FIG. 1.

FIG. 5 is a flowchart of method 200, a method for the operation of wireless device 14 during transmission and beacon reception. Method 200 comprises seven steps. First, wireless device 14 wakes from long term sleep mode at transmission wakeup time $t_{tWakeup}$, according to clock 110, performs application specific behavior as described above, and transmits a message to access point 12. (Step 202). Transmission wakeup time $t_{tWakeup}$ is calculated according to the method described above with respect to FIG. 4, and in greater depth below with respect to FIG. 6.

Next, wireless device 14 calculates a beacon reception wakeup time $t_{bWakeup}$ as described above with respect to FIG. 3. (Step 204). Processor 106 calculates this wakeup using history values stored in memory 112, as well as time information from clock 110. Wireless device 14 then enters a short-term sleep mode while the message is relayed to and processed at device node 16. (Step 206). Processor 106 sets a wakeup timer for beacon reception wakeup time $t_{bWakeup}$. During short term sleep, which ordinarily lasts less than one beacon interval $T_b$, a response from device node 16 is buffered at access point 12. Antenna 102 and transceiver 104 are unpowered in the sleep mode, but clock 110 remains continuously active.

Wireless device 14 wakes when clock 110 indicates that beacon reception wakeup time $t_{bWakeup}$ has arrived. (Step 208). Wireless device 14 then listens for a beacon, and receives buffered packets from access point 12. When the beacon is received by antenna 102 and transceiver 104, the actual local beacon reception time is recorded, and error term $\Delta_{error}$ and synchronization error E are calculated and stored, as described above with respect to FIG. 3. The beacon is then processed to determine whether any buffered message for wireless device 14 is waiting at access point 12. (Step 210). If a message is waiting, wireless device 14 retrieves this message. (Step 212). If no buffered message is waiting, or once the buffered message has been retrieved, the scheduling system of the present invention prepares for long term sleep by calculating the next beacon reception or transmission wakeup times. (Step 214). These wakeup times are calculated using the recorded actual beacon reception time $t_{bActual}$ or error term $\Delta_{error}$, application specific parameters such as link up and/or heartbeat interval, and as beacon history stored in memory 112, as described below with respect to FIG. 6. Processor 106 then sets a wakeup timer, as in step 204. Finally, wireless device 14 enters a long-term sleep mode from which it will wake up at step 202, as the cycle of method 200 repeats itself. (Step 216).

Although method 200 includes steps 202, 204, and 206 related to transmission, these steps may be omitted if no transmission is necessary prior to receiving a beacon. Accordingly, the wakeup timer may be set for a beacon reception wakeup time $t_{bWakeup}$ rather than a transmission wakeup time $t_{tWakeup}$ in step 214, such that step 208, rather than step 202, immediately follows step 216. Similarly, a response may or may not be expected following transmission of a message from antenna 102 of wireless device 14. If no response is expected, steps 204, 206, 208, 210, and 212 can be skipped, such that step 214 immediately follows step 202. In some instances, the next wakeup time scheduled in step 214 may be a wakeup for application-specific activity.

Method 200 calculates wakeup times in steps 204 and 214 based on beacon history from memory 112. Wakeup timers are set using a clock drift estimation, as described below with respect to FIG. 6. This enables wakeup times to be synchronized to meet or avoid beacons, as necessary, to reduce power draw.

Figure 6:
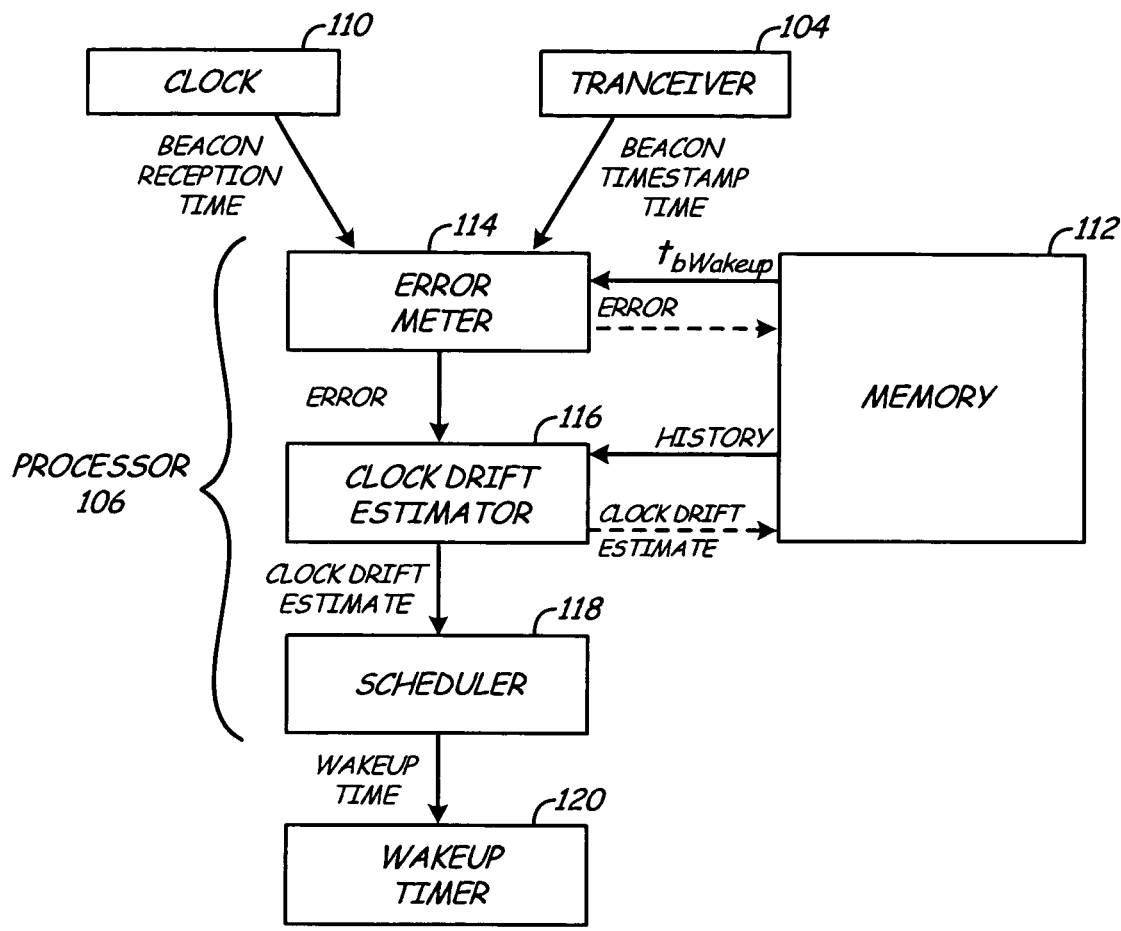
FIG. 6 is a block diagram of the logical components of a scheduling system for the wireless device of FIG. 1.

FIG. 6 depicts logical components of the scheduling system used by wireless device 14 to set transmission wakeup time $t_{bWakeup}$, describing step 204 and 218. It includes clock 110, transceiver 104, processor 106, memory 112, and wakeup timer 120. Processor 106 includes error meter 114, clock drift estimator 116, and scheduler 118, which may be logical functions performed by a microprocessor, or discrete electronic components.

As previously described, clock 110 is a low-power timekeeper, transceiver 104 is a data transducer, and memory 112 is a sleep-survivable memory storage element. Error meter 114 is a logical component which performs arithmetic to determine error term $\Delta_{error}$ and other information related to discrepancies between expected and actual beacon arrival times, such as information on accidental beacon reception during sending the linkup packet (described in further detail below). Clock drift estimator 116 is a logic component which estimates clock drift based on history recorded in memory 112 and the output of error meter 114, including error term $\Delta_{error}$. Scheduler 118 is a logic component which maps the clock drift estimate produced by clock drift estimator 116 onto wakeup times. This time is used to set wakeup timer 120. Wakeup timer 120 can be a reference timer compared with clock 110, a separate countdown clock, or any functionally analogous component capable of triggering a wakeup after a specified time.

Error meter 114 reads clock 110 and reports actual beacon reception time $t_{bActual}$ whenever a beacon is received. Error meter 114 compares actual beacon arrival time $t_{bActual}$ with beacon reception wakeup time $t_{bWakeup}$ (calculated during a previous iteration using measurement interval and/or error terms E and $\Delta_{error}$. These error terms reflect the desynchronization between access point 12 and wireless device 14. In some embodiments of the present invention, this beacon error value may be stored in memory 112). In addition, each beacon carries a timestamp indicating the time—according to access point 12—that the beacon was sent. This timestamp value is ordinarily an integer multiple of beacon interval $T_b$, but may sometimes be modified by a delay caused by busy channel, or by a static offset error due to implementation error at access point 12. Consecutive beacons timestamp values are ordinarily separated by beacon interval $T_b$. Under some circumstances, however, beacon signals may be lost. Error meter 114 recognizes when a beacon has been lost by comparing the timestamp value with an expected value, correcting error term $\Delta_{error}$ for beacon loss.

Clock drift estimator 116 produces an estimate as to the net clock drift of access point 12 relative to wireless device 14. If the clock drift rates of access point 12 and wireless device 14 were constant, net clock drift over a period of time would simply be the net clock drift rate multiplied by the length of the period. In practice, however, the clocks of access point 12 and wireless device 14 (such as clock 110) keep time at rates which vary based on parameters such as temperature and component age. As a result, the net clock drift rate between access point 12 and wireless device 14 fluctuates with time. Net clock drift rate does not change arbitrarily quickly, however, and past clock drift rates are indicative of the likely drift rates and rates of change of drift rates, in the future.

Clock drift estimator 116 produces clock drift estimates based on the error term $\Delta_{error}$ and other information provided by error meter 114, as well as history values retrieved from memory 112. This clock drift includes clock drift rate, synchronization correction X, and may include other values corresponding to the degree of relative clock drift between wireless device 14 and access point 12 as well as device-up period $\Delta_{du}$. History values can be previous beacon errors, previous clock drift estimates, or both. In some embodiments, clock drift estimator 116 produces a new clock drift estimate by updating a previous clock drift estimate according to the new beacon error, using a filter function such as an adaptive least mean squares (LMS) filter, a low pass filter, or other well known statistical estimator. In some embodiments, clock drift estimator 116 estimates drift from an average (or any other useful function such as linear extrapolation) of beacon error or average clock drift over the last N beacon errors or clock drift adjustments. The resulting new clock drift estimate may be stored in memory 112 for later use by clock drift estimator 116. Clock drift estimator 116 recognizes traffic-related delays and static error in the timestamp value from access point 12, and accommodates delays due to software or hardware at access point 12, wireless device 14, or device node 16 by subtracting an appropriate processing time from the next wakeup.

Wireless device 14 wakes up at heartbeat intervals, as described previously with respect to the prior art. Instead of using a constant heartbeat interval, wireless device 14 schedules heartbeat wakeup such that packet transmissions occurs as far away as possible from predicted beacon arrival times and corresponding beacon wakeup times $t_{bWakeup}$. The same method can be applied to linkup messages. In one embodiment, each transmission wakeup time $t_{tWakeup}$ is scheduled to occur during the first half of beacon interval $T_b$. As described previously, wireless device 14 may return to a sleep mode immediately after transmitting a packet. Although transmission wakeup time $t_{tWakeup}$ is scheduled as far as possible from beacon reception wakeup time $t_{bWakeup}$, it is possible for a beacon to be received during a transmission wakeup, for instance if a packet must be retransmitted due to packet corruption, or due to other system delays or erroneous implementations. Such unexpected beacon reception events can result in wireless device 14 resynchronizing unexpectedly with access point 12, resulting in an incorrect estimation of clock drift. Clock drift estimator 116 analyzes beacon timestamp values to compensate error terms E or $\Delta_{error}$ for unintentional beacon reception by scaling a clock drift estimate according to the time between latest such event and the next predicted beacon reception wakeup time $t_{bWakeup}$ in relation with the last error measurement. Static offset errors to beacon timestamp values can be recognized and removed with, for instance, a digital filter.

The clock drift estimate produced by clock drift estimator 116 is used by scheduler 118 to set wakeup times (i.e. $t_{bWakeup}$ and $t_{tWakeup}$) on wakeup timers 120. Wakeup times are determined using the clock drift estimate provided by clock drift estimator 116. In this way, wakeup of wireless device 14 is scheduled to minimize time spent listening or transmitting, and therefore conserves power from power supply 100.

Wireless device 14 uses a wakeup scheduling system which estimates beacon transmission times based on history data stored in sleep survivable memory. By using this system, wireless device 14 is able to schedule wakeup times for beacon reception very close to the actual times of beacon transmission, thereby limiting the energy expended to power wireless device 14. Similarly, this system allows wireless device 14 to schedule wakeup times for transmissions to avoid the beacon, thereby reducing the likelihood of delay or retransmission, and thereby conserving power. In one embodiment, wakeup and transmission can happen due to unplanned events, such that no scheduling can be done for such wakeups. In such a case, if packet reception is expected, according to the previous stored clock drift value, the next beacon arrival time can be predicted from the number of beacon intervals which passed during the period from the previous beacon reception time and the unplanned wakeup time.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

What is claimed and desired to protect by Letters Patent is:

1. A wireless device comprising:
   a transceiver for transmitting and receiving messages to and from an access point, the wireless device having a sleep mode from which a device application wakes up to perform actions and the transceiver may turn on to listen for beacons from the access point to transmit and receive packets; and
   a scheduling system which schedules each application wake up and transceiver turn-on time, the scheduling system comprising a clock drift estimator and wake up adjustment procedure which determines an expected clock drift from a history of synchronization errors calculated with each beacon reception, wherein each synchronization error is computed as the difference between a wireless device actual beacon arrival time and the wakeup time;
   wherein the scheduling system schedules the wakeup time such that:

$$t_{bIdeal} - t_{bWakeup} = \Delta_{du} + E$$

where $t_{bIdeal}$ is an ideal beacon time, $t_{bWakeup}$ is beacon reception wakeup time, $\Delta_{du}$ is device-up period and E reflects the expected clock drift;
   wherein the scheduling system schedules the wakeup time independent of timestamps associated with beacons.

2. The wireless device of claim 1, wherein the transceiver is deactivated during the sleep mode.

3. The wireless device of claim 1, wherein the scheduling system schedules wakeup times for beacon reception to occur immediately before expected beacon transmissions.

4. The wireless device of claim 1, wherein the scheduling system differentiates between synchronization error due to clock drift, and non-drift errors including one or more of static error in a timestamp value from the access point, beacon delays caused by wireless message, and software or hardware delays.

5. The wireless device of claim 1, wherein the history of synchronization errors comprises previous expected clock drift values.

6. The wireless device of claim 1, wherein the history of synchronization errors comprises previous synchronization error values.

7. The wireless device of claim 1, wherein the scheduling system identifies beacon loss while determining expected clock drift.

8. A wireless system comprising:
   an access point device which periodically transmits beacons to a network, and which is connected to a device node; and
   a wireless device in the network, the wireless device comprising:
      a transceiver with an active mode wherein the transceiver is capable of transmitting and receiving messages, and a sleep mode wherein the transceiver is unpowered;
      an application system which sends and/or receives data to and/or from the device node periodically via the transceiver and the access point;
      a timer; and
      a scheduling system which adjusts a wakeup time on the timer before the transceiver enters the sleep mode, the wakeup time being a time at which the transceiver wakes from the sleep mode to the active mode;
      wherein the scheduling system comprises a clock drift estimator which determines an expected clock drift from a synchronization error calculated with each beacon reception, wherein the synchronization error is determined from a difference between an actual beacon arrival time and the wakeup time;
      wherein the scheduling system schedules the wakeup time such that:

$$t_{bIdeal} - t_{bWakeup} = \Delta_{du} + E$$

where $t_{bIdeal}$ is an ideal beacon time, $t_{bWakeup}$ is beacon reception wakeup time, $\Delta_{du}$ is device-up period and E reflects the expected clock drift;
      wherein the scheduling system schedule the wakeup time independent of timestamps associated with beacons.

9. The wireless system of claim 8, wherein:
   the wireless device regularly wakes from the sleep mode at transmission wakeup times to transmit linkup messages to the access point device so as to remain in the network; and
   each time a linkup message is transmitted, the scheduling system selects transmission wakeup times so as not to coincide with beacon transmission times.

10. The wireless system of claim 8, wherein:
    the wireless device regularly wakes up at heartbeat intervals to perform application task and transmit packets; and
    the scheduling system selects heartbeat intervals so that packet transmission times do not coincide with beacon transmission times.

11. The wireless device of claim 1, wherein the scheduling system identifies beacon loss while determining expected clock drift.

12. The wireless device of claim 1, wherein the scheduling system comprises a measurement module to schedule the wake up time to receive linkup messages from the access point.

* * * * *